United States Patent [19]
Hayes et al.

[11] Patent Number: 5,426,653
[45] Date of Patent: Jun. 20, 1995

[54] METHOD AND APPARATUS FOR PERFORMING ERROR CORRECTION ON A SIGNAL RECEIVED BY A RADIO COMMUNICATION DEVICE

[75] Inventors: David Hayes; Charles E. Batey, Jr., both of Lake Worth; Joan S. DeLuca, Boca Raton, all of Fla.

[73] Assignee: Motorola, Inc., Schaumburg, Ill.

[21] Appl. No.: 98,190

[22] Filed: Jul. 28, 1993

[51] Int. Cl.$^6$ .............................................. H04L 1/08
[52] U.S. Cl. ....................................... 371/36; 371/37.1
[58] Field of Search ...................... 371/36, 37.1, 37.2, 371/37.3, 37.4, 40.1

[56] References Cited

U.S. PATENT DOCUMENTS

| | | | |
|---|---|---|---|
| 4,312,074 | 1/1982 | Pautler et al. | 375/96 |
| 4,794,601 | 12/1988 | Kikuchi | 371/36 |
| 4,803,685 | 2/1989 | Oget | 371/36 X |
| 4,984,290 | 1/1991 | Levine | 455/33 |
| 5,036,532 | 7/1991 | Metroka et al. | 379/58 |
| 5,051,999 | 9/1991 | Erhart et al. | 371/41 |
| 5,073,932 | 12/1991 | Yossifor et al. | 371/36 |
| 5,241,548 | 8/1993 | Dillon et al. | 371/36 |
| 5,321,703 | 6/1994 | Weng | 371/36 |

*Primary Examiner*—Roy N. Envall, Jr.
*Assistant Examiner*—Brian C. Oakes
*Attorney, Agent, or Firm*—Kelly A. Gardner; John H. Moore

[57] ABSTRACT

A radio communication device (100) receives a radio frequency (RF) signal comprising at least first, second, and third words which include message information and error correction information, wherein the second and third words are redundant words associated with the first word. A processing unit (120) included in the radio communication device (100) compares each corresponding bit of the first, second, and third words to determine, for each corresponding bit, which of first and second bit values is a majority bit value and generates a fourth word which includes a bit for each corresponding bit, wherein each bit of the fourth word has a value equivalent to the majority bit value corresponding thereto. Error correction circuitry (135) coupled to the processing unit (120) performs error correction on each of the first, second, third, and fourth words utilizing the error correction information, subsequent to which the processing unit (120) selects message information included in one of the first, second, third, and fourth words for presentation when at least one of the first, second, third, and fourth words has been corrected.

13 Claims, 7 Drawing Sheets

|  | m BITS OF MESSAGE INFO. | (n-m) BITS OF ERROR CORRECTION INFO |
|---|---|---|
| WORD OF SENT MESSAGE | 0000 0000 0000 0000 | 0000 0000 0000 000 |
| WORD IN 1st MESSAGE | 0010 1000 0000 0100 | 0000 0000 0000 100 |
| WORD IN 2nd MESSAGE | 0000 0010 0000 0000 | 0001 0100 0000 100 |
| WORD IN 3rd MESSAGE | 1000 0000 0100 0100 | 0000 0000 1000 000 |
| SUPER WORD | 0000 0000 0000 0100 | 0000 0000 0000 100 |

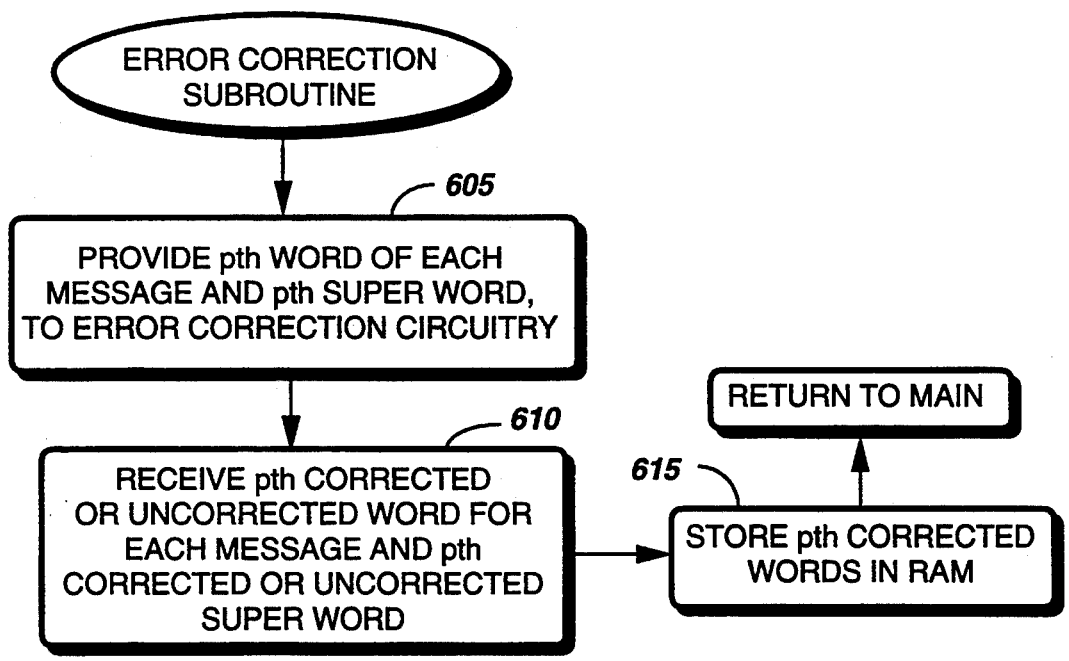

FIG. 6

| # OF CORRECTED WORDS | RESULT OF COMPARISON OF CORRECTED WORDS | SELECTED WORD |
|---|---|---|
| 4 | ALL 4 DIFFERENT | SUPER WORD |
|   | 3 MATCH, 1 DIFFERENT | MATCHING WORD |
|   | 2 MATCH, 2 MATCH | SUPERWORD |
|   | 2 MATCH, 2 DIFFERENT | MATCHING WORD |
|   | ALL 4 MATCH | MATCHING WORD |
| 3 | ALL 3 DIFFERENT | SUPER WORD, IF CORRECTED |
|   | 2 MATCH, 1 DIFFERENT | MATCHING WORD |
|   | ALL 3 MATCH | MATCHING WORD |
| 2 | BOTH DIFFERENT | SUPER WORD, IF CORRECTED |
|   | BOTH MATCH | MATCHING WORD |
| 1 | — | CORRECTED WORD |
| 0 | — | NO SELECTION, DON'T ALERT |

FIG. 9

METHOD AND APPARATUS FOR PERFORMING ERROR CORRECTION ON A SIGNAL RECEIVED BY A RADIO COMMUNICATION DEVICE

FIELD OF THE INVENTION

This invention relates in general to radio communication, and more specifically to a method and apparatus for correcting errors in signals received by a radio communication device.

BACKGROUND OF THE INVENTION

Paging receivers typically receive radio frequency signals which are decoded to recover data included therein. The data recovery process, however, is often subject to error due to fading of the signal or interference. Sources of interference may be, for example, other radio signals within the same geographic region or high frequency harmonics generated by the paging receiver itself. As a result, many techniques have been developed for correcting errors in signals received by paging receivers.

For radio signaling protocols, such as GSC (Golay Sequential Code) protocol or POCSAG (Post Office Code Standardization Advisory Group) protocol, in which error correction techniques are employed, error correction information is typically appended to each transmitted message. Thereafter, a paging receiver which receives the message utilizes the error correction information to verify and correct bits of the received message. The paging receiver, however, can only correct a predetermined number of bits included in each word of the message by utilizing the error correction information. Therefore, the error correction information is useless for words having more than the predetermined number of bits in error.

Some conventional paging systems, as a result, include paging terminals for transmitting messages more than a single time. One paging system, for example, transmits each message three times. Paging receivers included in the paging system commonly receive and decode all three of the messages. Subsequently, each word of a first message is corrected using the error correction information associated therewith. When a word included in the first message cannot be corrected, i.e., when more than a predetermined number of bits is in error, a corresponding word included in one of the other two messages is error-corrected and substituted for the word that cannot be corrected. In this manner, a paging receiver can conveniently form a complete, error-free message comprising, if necessary, words from all three of the repeatedly transmitted messages.

This method, however, does not always yield a complete message because, when the paging receiver is in a fading or noisy environment, it is entirely possible that a corresponding word included in all three messages will be uncorrectable. In this situation, the paging receiver either presents an erroneous message or does not announce reception of the message at all.

Thus, what is needed is a paging receiver which employs improved error correction techniques, thereby allowing for presentation of an error-free message even when words of the message include greater than a predetermined number of bits in error.

SUMMARY OF THE INVENTION

A radio frequency signal comprises at least first, second, and third words of at least first, second, and third duplicate messages, respectively, wherein each word includes message information and error correction information, and wherein the second and third words are redundant words associated with the first word. A method for performing error correction in the radio communication device includes the steps of comparing each corresponding bit of the first, second, and third words to determine, for each corresponding bit, which of first and second bit values is a majority bit value. The method further comprises the steps of generating a fourth word including a bit for each corresponding bit included in the first, second, and third words, wherein each bit of the fourth word has a value equivalent to the majority bit value corresponding thereto and performing error correction on each of the first, second, third, and fourth words utilizing the error correction information. A number of corrected words included in the first, second, third, and fourth words is then determined. In response to the determining step, the message information included in one of the first, second, third, and fourth words is chosen depending upon the number of corrected words. In response to determining that one corrected word resulted from the performing step, the choosing step comprises the step of selecting message information included in the one corrected word for presentation.

A radio communication device receives a radio frequency (RF) signal comprising at least first, second, and third words of at least first, second, and third duplicate messages, respectively, wherein each word including message information and error correction information, and wherein the second and third words are redundant words associated with the first word. The radio communication device includes comparing circuitry for comparing each corresponding bit of the first, second, and third words to determine, for each corresponding bit, which of first and second bit values is a majority bit value. Generating circuitry coupled to the comparing circuitry generates a fourth word which includes a bit for each corresponding bit included in the first, second, and third words, wherein each bit of the fourth word has a value equivalent to the majority bit value corresponding thereto. Error correction circuitry coupled to the generating circuitry performs error correction on each of the first, second, third, and fourth words utilizing the error correction information. Determining circuitry then determines a number of corrected words included in the first, second, third, and fourth words. Choosing circuitry selects message information included in one of the first, second, third, and fourth words, said choosing circuitry selecting, if said determining means determines that one word has been corrected by the correcting means, the message information in said one corrected word.

BRIEF DESCRIPTION OF THE DRAWINGS

FIGS. 3, 4, 6, 7 and 8 are flowcharts depicting the operation of a central processing unit included in the radio communication device of FIG. 1 in accordance with the present invention.

FIG. 5 is an illustration depicting formation of a "super" word from received message words in accordance with the present invention.

FIG. 9 is a table of message information chosen by the central processing unit of FIG. 1 in response to the error correction of the received message words and the super word generated therefrom in accordance with the present invention.

DESCRIPTION OF A PREFERRED EMBODIMENT

Figure 1:
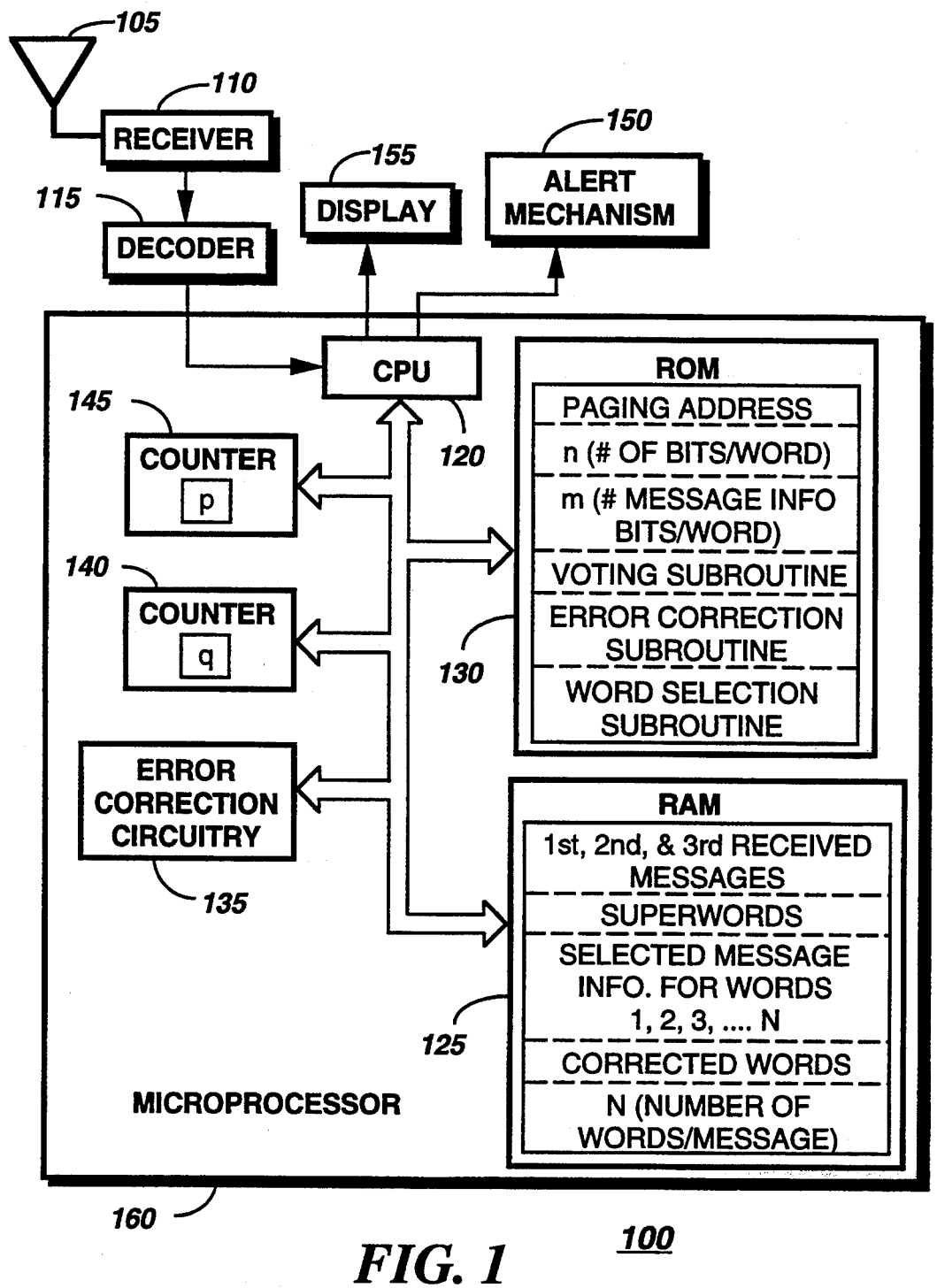
FIG. 1 is an electrical block diagram of a radio communication device for performing error correction on a received signal in accordance with the present invention.

FIG. 1 is an electrical block diagram of a radio communication device 100 in accordance with the present invention. The radio communication device 100 comprises an antenna 105 for receiving a radio frequency (RF) signal and a receiver 110 coupled to the antenna 105 for demodulating the RF signal to generate data therefrom. A decoder 115 coupled to the receiver 110 recovers addresses and messages included in the RF signal.

Figure 2:
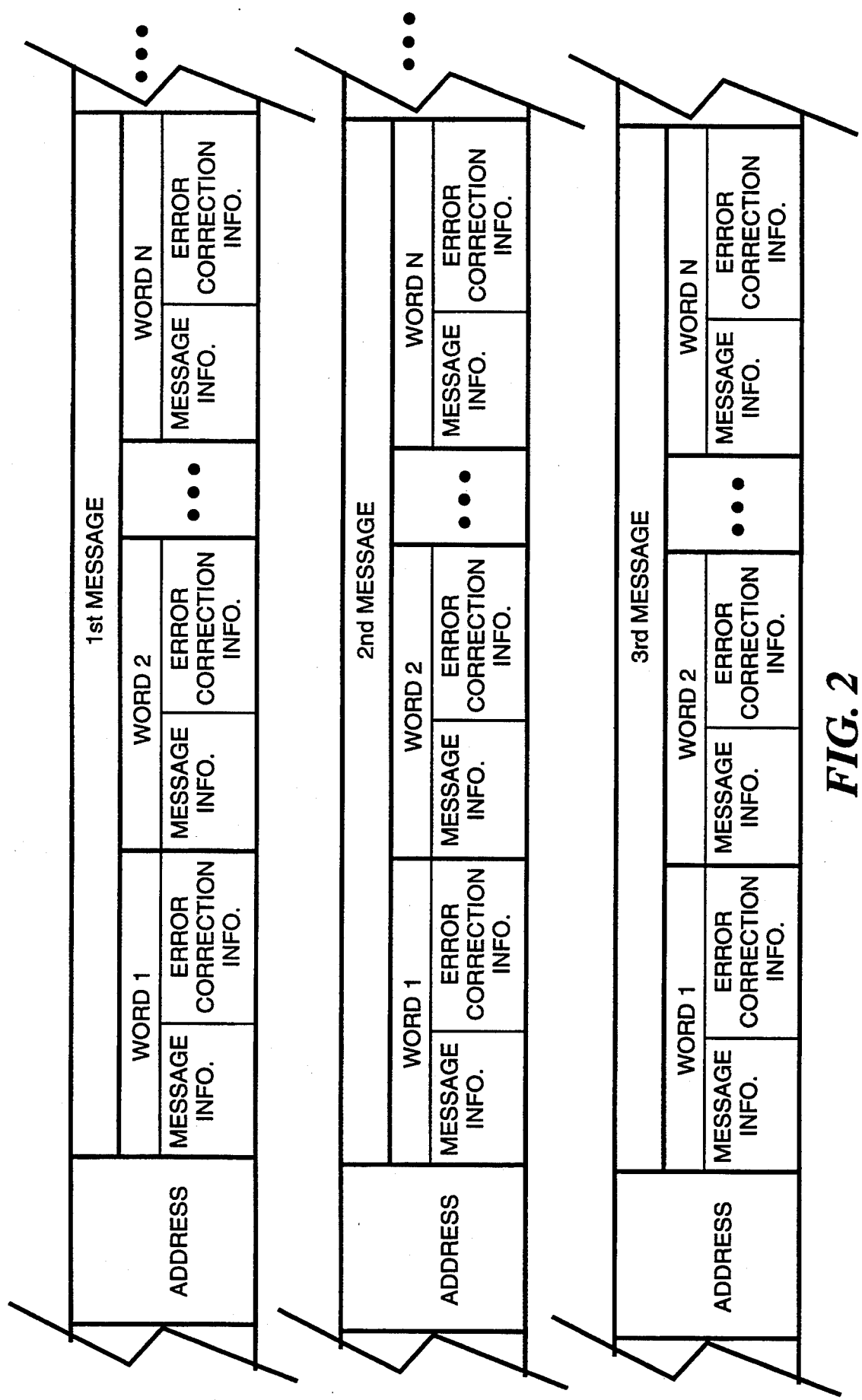
FIG. 2 is a signaling diagram of a signal received by the radio communication device of FIG. 1 in accordance with the present invention.

Referring next to FIG. 2, a signaling diagram of an RF signal according to the present invention is depicted. Preferably, each message intended for reception by the radio communication device 100 is transmitted more than a single time. Each message, for example, can be transmitted three times, although it will be appreciated that any number of messages can be provided for redundancy. As shown, each message is preceded by a paging address indicative of the radio communication device 100. Following the addresses are the first, second, and third messages, each of which comprises a number of words. According to the present invention, each word includes message information, which comprises a first predetermined number of bits, and error correction information, which comprises a second predetermined number of bits. The error correction information is utilized to perform error correction on each word of the message in a manner well known to one of ordinary skill in the art. In this manner, when bits of the received message words are in error because of interference or signal fading, the erroneous bits can be conveniently corrected to yield error-free message information for presentation to a user. The error-correction process, however, can only be performed when the number of bits in error is less than a predetermined number. When each word comprises sixteen bits of message information and fifteen bits of error correction information, for instance, no more than three bits per word can be corrected.

Returning to FIG. 1, the radio communication device 100 further comprises a central processing unit (CPU) 120 for controlling the operation of the radio communication device 100. The CPU 120 preferably stores the decoded messages in a memory when the addresses decoded from the signal are equivalent to a stored paging address. The memory in which the decoded message are stored can be, for example, a random access memory (RAM) 125 for temporarily storing variables derived during operation of the radio communication device 100. A memory in which the paging address of the radio communication device 100 is stored is preferably a non-volatile memory, such as a read only memory (ROM) 130, which is employed to store pre-programmed parameters and subroutines which are executed during operation of the radio communication device 100. The pre-programmed parameters can comprise, for example, one or more paging addresses on which the radio communication device 100 receives messages, a number n of bits per word for the received messages, and a number m of message information bits included in each word.

According to the present invention, the CPU 120, with reference to counters 140, 145, executes a voting subroutine using each word of the three received messages to generate a fourth message, i.e., a "super" message, bits of which reflect majority bit values for each bit included in the words of the received messages. More specifically, each bit of each word of a received message is compared to corresponding bits in the other received messages to determine a majority bit value, which is preferably either a "zero" or a "one". A corresponding bit of the super message is then formed reflecting the majority bit value. If, for instance, the first bit of the first message is a one, the first bit of the second message is a zero, and the first bit of the third message is a one, the first bit of the super message is set as a one. This procedure is followed until an entire super message, having a number n of bits per word, is formed. In accordance with the present invention, the super message can advantageously contain less errors than the received messages because it is unlikely that corresponding bits in the received messages will all be received erroneously.

Further included in the radio communication device 100 is conventional error correction circuitry 135 for performing error correction on all of the words included in the three received messages and the super message. The error correction circuitry 135 can, for example, perform error correction in accordance with BCH (Bose, Chaudhuri, and Hocquenghem) error correction techniques. Circuits and methods for performing error correction are taught in detail in U.S. Pat. No. 5,051,999 by Erhart et al., which is assigned to Motorola, Inc., and which is hereby incorporated by reference. According to the present invention, words of the super message, i.e. super words, as well as words of each received message, are corrected by the error correction circuitry 135. Therefore, when a corresponding word of each received message is unable to be corrected due to a large number of erroneous bits, the super word corresponding thereto may still be correctable because, as mentioned above, each super word is likely to contain less errors than the corresponding words of the received messages. As a result, error-free message information can often be presented to a user even when words of the received messages are not correctable. In conventional radio communication devices, on the other hand, when corresponding words of redundant messages all contain greater than a predetermined number of errors, either the message information presented to a user is erroneous or the message information is not presented at all, resulting in a missed page.

The radio communication device 100 preferably determines whether, after error correction, an entire error-free message can be formed from the message information in the three received messages and the super message. In response to formation of an entire presentable message, the CPU 120 activates an alert mechanism 150, such as a transducer, for generating a sensible alert, e.g., an audible tone. Thereafter, the error-free message is presented to the user, perhaps through use of a display 155 for visibly presenting information.

According to the present invention, the CPU 120, RAM 125, ROM 130, error correction circuitry 135, and counters 140, 145, can be implemented in a microprocessor 160, such as the MC68HC05C4 microprocessor manufactured by Motorola, Inc. Alternatively, hard-wired logic can be utilized to perform equivalent operations.

Figure 3:
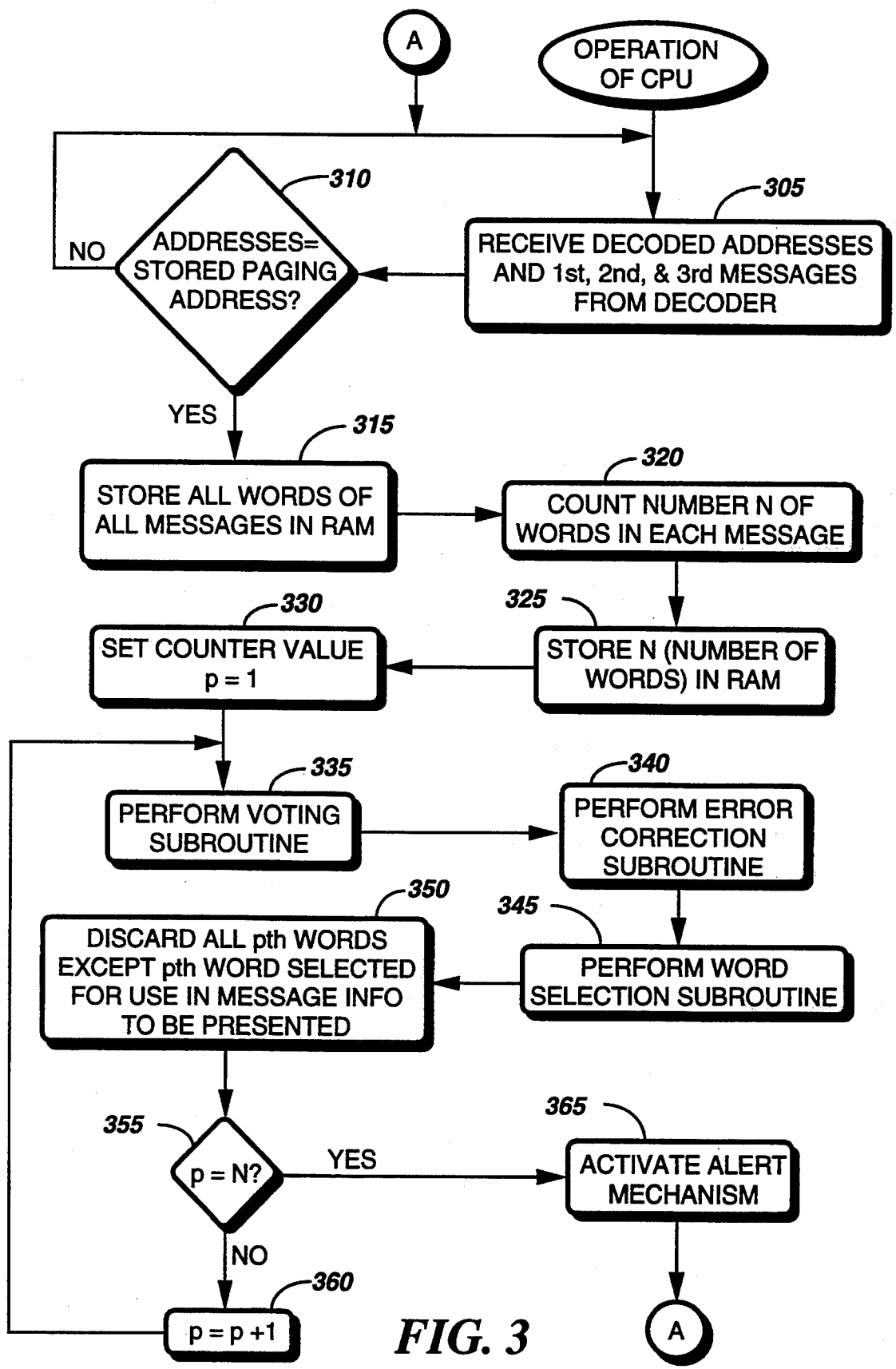

FIGS. 3, 4, and 6-8 are flowcharts depicting the operation of the CPU 120 in accordance with the present invention. Referring first to FIG. 3, the CPU 120 receives the decoded addresses and redundant messages associated therewith from the decoder 115 at step 305. The CPU 120 then compares, at step 310, the decoded addresses with the paging address stored in the ROM 130 (FIG. 1) to determine whether the messages are intended for reception by the radio communication device 100. All words of all messages intended for reception by the radio communication device 100 are stored, at step 315, in the RAM 125. Additionally, at steps 320, 325, the number N of words included in each message are counted, and the variable N is stored in the RAM 125. The variable N is, as will be described below, used for further processing of the received messages. After storage of the received messages, the CPU 120 initializes the counter 145 (FIG. 1), i.e., the CPU 120 sets counter value p equal to one, at step 330.

Thereafter, for the pth word of each message, the CPU 120 performs a voting subroutine, at step 335, during which the pth super word of the super message is generated. An error correction subroutine is then performed, at step 340, to correct erroneous bits of the pth word of each of the received messages and the super message, after which a word selection subroutine is performed, at step 345. During the word selection subroutine, message information included in one of the pth words is selected for use in the complete message to be presented to a user. At step 350, the CPU 120 subsequently discards from the RAM 125 all of the pth words except the pth word from which the message information was selected. In this manner, as described above, the "most correct" message information for each corresponding word is selected for presentation to a user.

After selection of the message information, the CPU 120 determines, at step 355, whether the subroutines have been performed for each word of each message, i.e., whether p=N. When further words of the messages are to be processed, i.e., when p≠N, the counter 145 is incremented, at step 360, and processing continues at step 335. When all words in the messages have been processed, the CPU 120, at step 365, activates the alert mechanism 150 (FIG. 1) to announce reception of a message to the user. As will be explained in greater detail below, step 365 preferably only occurs when at least one word has been corrected for each of the N words of each message.

Figures 4, 5:
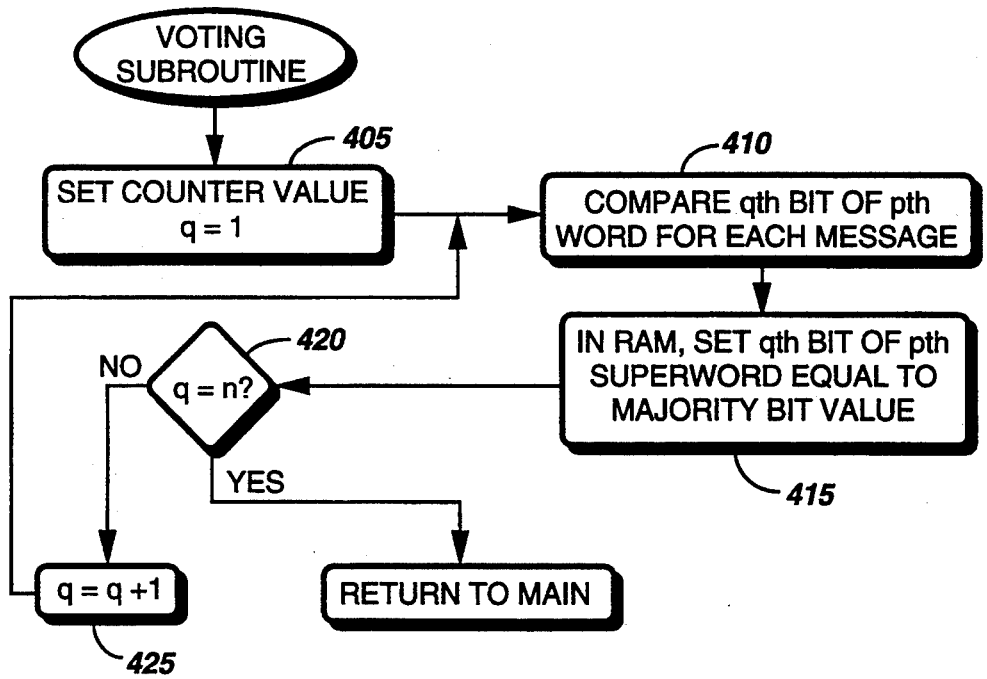

Referring next to FIG. 4, a flowchart depicts the voting subroutine, executed by the CPU 120 at step 335 of FIG. 3. At step 405 (FIG. 4), the CPU 120 initializes the counter 140 (FIG. 1) to set the counter value q equal to one. The CPU 120 then compares, at step 410, the qth bit of the pth word for each received message to determine the majority bit value for the qth bit. At step 415, the qth bit of the pth super word is, according to the present invention, set to have a value equivalent to the majority bit value. If, for example, two of the qth bits are equal to one, the majority bit value is determined to be one, and the qth bit of the pth super word is stored as a one in the RAM 125 (FIG. 1). The CPU 120 next determines, at step 420, whether all bits of the pth words have been compared to generate the entire pth super word, i.e., whether q=n, wherein n is the number of bits per word. If not, the counter 140 is incremented, i.e., q=q+1, at step 425, and further bits of the received words are compared, at step 410, to generate further bits of the super word, at step 415. When all bits of the pth super word have been generated, the CPU 120 returns to step 340 (FIG. 3) to perform the error correction subroutine.

FIG. 5 shows an example of a super word which is formed from the three shown message words received by the radio communication device 100 (FIG. 1). By way of example, each received message word comprises sixteen bits of message information and fifteen bits of error correction information. Therefore, three erroneous bits of information can be corrected for each word. As shown in FIG. 5, the message word as transmitted comprises all zeros. However, each received message word includes greater than three erroneous bits of information. As a result, the received message words themselves are uncorrectable. In prior art radio receivers, the uncorrectable message words would result in a missed page because the user would not be alerted or presented with a complete message. However, in accordance with the present invention, the radio communication device 100 (FIG. 1) generates from the received message words a super word which may be correctable. As described in reference to FIG. 4, each corresponding bit of the received message words is compared to determine a majority bit value, i.e., either a one or a zero. By way of example, the third bit of the first message word is a one, while the third bits of the second and third message words are zeros. The majority bit value is therefore zero, and the third bit of the super word is set to zero. In the example shown, the super word generated from the received message words only comprises two erroneous bits. As a result, the super word is a correctable word, and the message information included therein can be substituted for message information included in the first, second, or third received message words to result in error-free message information.

Referring to FIG. 6, the error correction subroutine performed by the CPU 120 at step 340 of FIG. 3 is depicted. At step 605 (FIG. 6), the CPU 120 provides the pth word of each message, including the super message, to the error correction circuitry 135 (FIG. 1) for correction thereby in a manner well known to one of ordinary skill in the art. As mentioned above, it is possible that the pth super word provided to the error correction circuitry 135 may be correctable even if the pth words of the received messages are not. Thereafter, at step 610, the pth words are returned to the CPU 120, along with an indication of whether or not each word has been corrected. The pth words which have been corrected are then stored in the RAM 125, at step 615. After completion of the error correction subroutine, the operation of the CPU 120 is returned to step 345 (FIG. 3) to perform the word selection subroutine.

Figure 7:
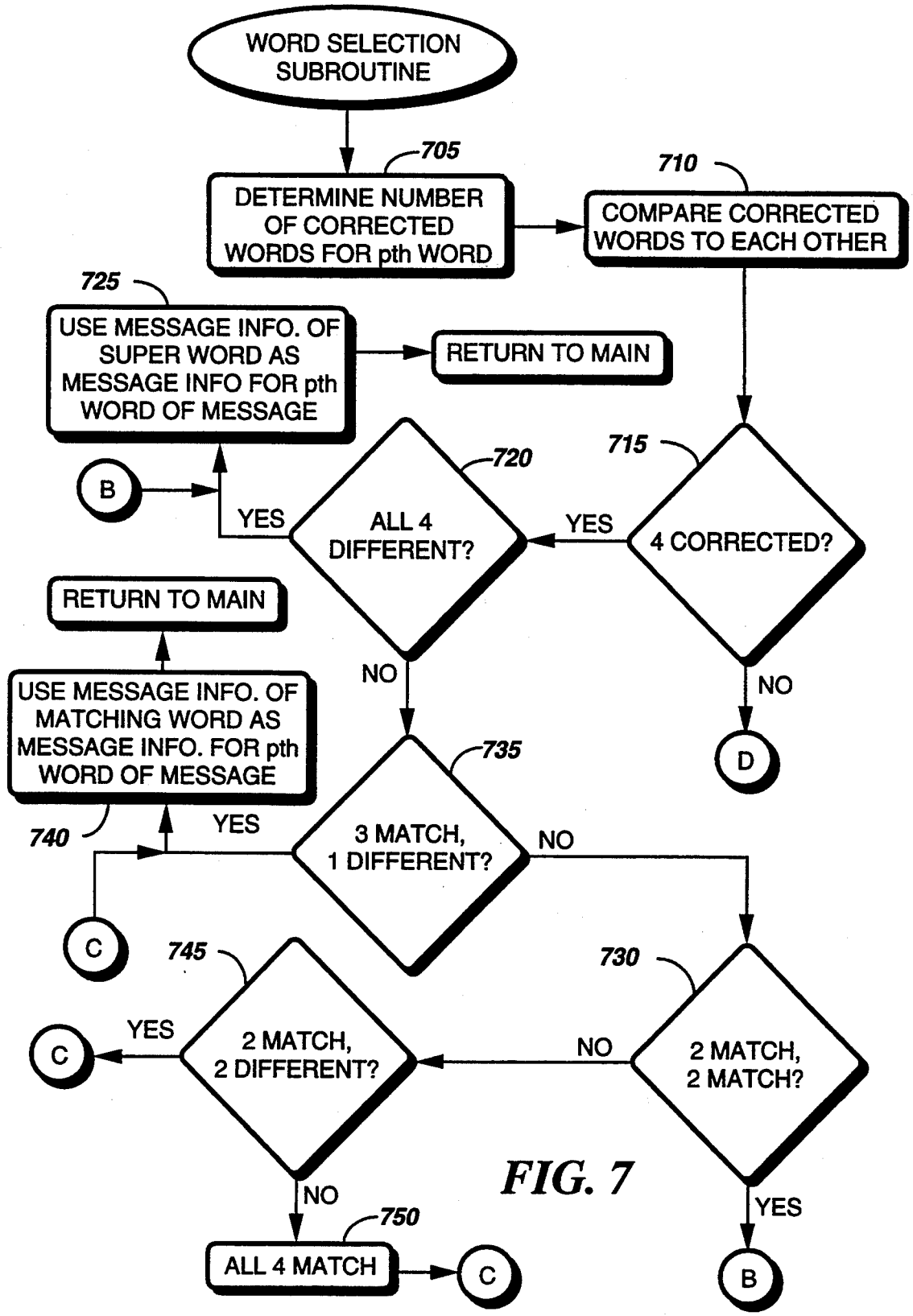
Figure 8:
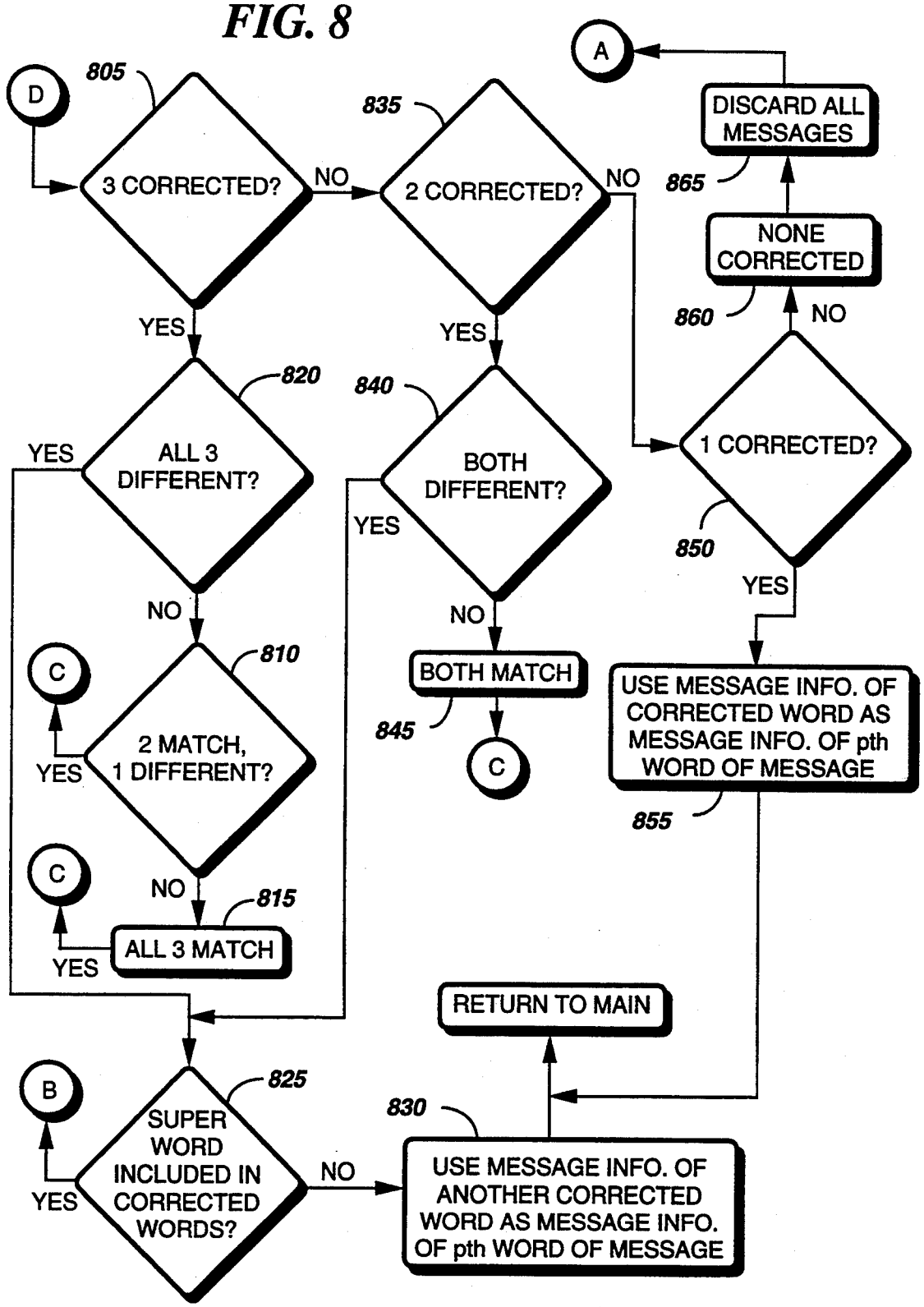

FIGS. 7 and 8 are flowcharts depicting the word selection subroutine in accordance with the preferred embodiment of the present invention. Preferably, at step 705 (FIG. 7), the CPU 120 determines, for the pth words, the number of corrected words provided by the error correction circuitry 135 and then compares, at step 710, the corrected words to each other. When, at step 715, four words have been corrected, and, at step 720, all four are different from each other, the message information included in the pth super word is preferably utilized, at step 725, as the message information associated with the pth word of the complete, error-free message for presentation to a user. The pth super word is preferably chosen because it is likely that the super word required the least amount of error correction. After selection of the word front which message information is to be used, the operation of the CPU 120 continues at step 350 (FIG. 3). When, at step 730, two of four corrected words form a first set of matching words, i.e., all bits are equal, and the other two of the four corrected words form a second set of matching words, the CPU 120 also selects, at step 725, the message information included in the super word as the message information for the pth word of the complete, presentable message.

When, at step 735, three of the four corrected words match, and one word is different front the others, message information included in a matching word is preferably chosen, at step 740, for use in the complete message. Message information included in a matching word is also selected, at step 740, either when, at step 745, two words match and two are different or when, at step 750, all four corrected words match. As described above, once message information to be associated with the pth word of the complete message has been selected, the CPU 120 returns to step 350 (FIG. 3).

Referring next to FIG. 8, when, at step 805, three words are corrected by the error correction circuitry 135 (FIG. 1), message information included in a matching word is preferably again selected, at step 740 (FIG. 7), when either two words match and one is different, at step 810, or when all three words match, at step 815. When, at step 820, all three of the corrected words are different front each other, the CPU 120 further determines, at step 825, whether the super word has been corrected. When the super word is included in the corrected words, the message information included in the super word is selected, at step 725 (FIG. 7) for use as message information in the complete message. When the super word is not included in the corrected words, message information included in one of the corrected words is chosen, at step 830. The message information may be, for example, chosen from the pth word of the last received message or from the pth corrected word which required the least amount of correction.

When, at step 835, the error correction circuitry 135 (FIG. 1) returns only two corrected words, the CPU 120 determines, at steps 840, 845, whether both corrected words match or both are different. When both match, at step 845, the message information associated with the pth word of the complete message is preferably chosen, at step 740 (FIG. 7) from one of the matching words. Otherwise, when, at step 840, both of the words are different and when, at step 825, the super word has been corrected, the message information included in the super word is selected, at step 725 (FIG. 7), by the CPU 120. When the super word is not included in the corrected words, message information included in one of the corrected words is selected, at step 830. When only one word is corrected, at step 850, message information included in the corrected word is selected, at step 855, for use in the complete message for presentation to a user. As described above, once message information has been selected by the CPU 120, the CPU 120 returns to step 350 of FIG. 3. In this mariner, once message information has been selected for each of the N words, the selected message information is combined to form the complete, error-free message which is presented to the user.

When, at step 860, the error correction circuitry 135 has corrected no words at all, all words of both the received messages and the super message are preferably discarded, at step 865, from the RAM 125 (FIG. 1). In this situation, at least one corresponding word, i.e., the pth word, of each of the messages contains greater than a predetermined number of erroneous bits and cannot be corrected. Therefore, operation of the CPU 120 continues at step 305 (FIG. 3), and the user is not alerted or presented with a complete message. Alternatively, in other embodiments of the present invention, the user could be presented with a complete message that is erroneous.

Referring to FIG. 9, a table shows the words from which the message information is selected by the CPU 120 during the word selection subroutine in accordance with the preferred embodiment of the present invention. By referring to the table, different selections of the CPU 120 can be easily seen for different numbers of corrected words and different numbers of matching words included in the number of corrected words. FIG. 9 depicts selections similar to those described in FIGS. 7 and 8. It will be appreciated by one of ordinary skill in the art, however, that the message information can, in alternate embodiments of the present invention, be selected differently than described above, as long as the message information is selected from a corrected word. It will be further appreciated that the selection of message information can vary depending upon the number of redundant messages received by the radio communication device 100.

In summary, the radio communication device as described above receives a plurality of redundant messages, each of which comprises at least one word which includes a first predetermined number of bits of message information and a second predetermined number of bits of error correction information. In accordance with the present invention, the radio communication device compares bits of each word included in the received messages to generate therefrom a "super" word, the bits of which have values corresponding to the majority bit values determined by comparison of the bits included in each word of the received messages. Because the super word has been formed by the above-described voting process for each of the bits in the received message words, the super word may often include a smaller number of erroneous bits than included in the received message words. Therefore, when both the received message words and the super word are subsequently error-corrected, the super word may be correctable even when the received message words are not. As a result, valid, error-free message information can be presented to a user even when the received message words cannot be corrected due to a large number of erroneous bits.

It may be appreciated by now that there has been provided an improved error correction technique for use in a radio communication device which receives redundant messages. The improved error correction technique can often provide an error-free message to a user even when the received redundant messages include errors which cannot be corrected using conventional error correction techniques.

We claim:

1. A method for performing error correction in a radio communication device that receives a radio frequency signal comprising at least first, second, and third words of at least first, second, and third duplicate messages, respectively, wherein each word includes message information and error correction information, and wherein the second and third words are redundant words associated with the first word, the method comprising the steps of:

comparing each corresponding bit of the first, second, and third words to determine, for each corresponding bit, which of first and second bit values is a majority bit value;

generating a fourth word including a bit for each corresponding bit included in the first, second, and third words, wherein each bit of the fourth word has a value equivalent to the majority bit value corresponding thereto;

performing error correction on each of the first, second, third, and fourth words utilizing the error correction information: and determining a number of corrected words included in the first, second, third, and fourth words; choosing, in response to the determining step, the message information included in one of the first, second, third and fourth words depending upon the number of corrected words;

wherein, in response to determining that one corrected word resulted from the performing step, the choosing step comprises the step of selecting message information included in the one corrected word for presentation.

2. The method according to claim 1, further comprising the step of:

discarding all but the message information included in the one of the first, second, third, and fourth words selected for presentation.

3. The method according to claim 1, wherein, in response to determining that four corrected words resulted from the performing step, the choosing step comprises the steps of:

selecting message information included in the fourth word for presentation when the four corrected words are determined to all be different;

selecting, when three of the four corrected words are matching words, message information included in one of the matching words for presentation;

selecting, when a first two of the four corrected words are first matching words and when a second two of the four corrected words are second matching words, message information included in the fourth word for presentation;

selecting, when a first two of the four corrected words are matching words and a second two of the four corrected words are non-matching words, message information included in one of the matching words for presentation; and selecting, when all of the four corrected words are matching words, message information included in the fourth word for presentation.

4. The method according to claim 1, wherein, in response to determining that three corrected words resulted from the performing step, the choosing step comprises the steps of:

selecting, when all three corrected words are different, message information included in the fourth word for presentation when the fourth word is included in the three corrected words; and selecting, when two or more of the three corrected words are matching words, message information included in one of the matching words for presentation.

5. The method according to claim 1, wherein, in response to determining that two corrected words resulted from the performing step, the choosing step comprises the steps of:

selecting, when the two corrected words are different, message information included in the fourth word for presentation when the fourth word is included in the two corrected words; and selecting, when the two corrected words are equivalent, message information included in either of the two corrected words for presentation.

6. The method according to claim 1, further comprising the step of:

generating an alert in response to determining that one or more of the first, second, third, and fourth words are corrected words resulting from the performing step.

7. A radio communication device for receiving a radiofrequency (RF) signal comprising at least first, second, and third words of at least first, second, and third duplicate messages, respectively, wherein each word including message information and error correction information, and wherein the second and third words are redundant words associated with the first word, the radio communication device comprising:

comparing means for comparing each corresponding bit of the first, second and third words to determine, for each corresponding bit, which of first and second bit values is a majority bit value;

generating means coupled to the comparing means for generating a fourth word which includes a bit for each corresponding bit included in the first, second, and third words, wherein each bit of the fourth word has a value equivalent to the majority bit value corresponding thereto;

error correction circuitry coupled to the generating means for performing error correction on each of the first, second, third, and fourth words utilizing the error correction information:

determining mean for determining a number of corrected words include in the first, second, third, and fourth words; and choosing means for selecting message information included in one of the first, second, third and fourth words, said choosing means selecting, if said determining means determines that one word has been corrected by the correcting means, the message information contained in said one corrected word.

8. The radio communication device according to claim 7, further comprising:

a receiver for receiving and demodulating the RF signal to recover data included therein;

a decoder coupled to the receiver for decoding the data to recover the error correction information and message information included in the first, second, and third words; and a memory coupled to the decoder for storing the first, second, third, and fourth words.

9. The radio communication device according to claim 7, wherein the comparing means, the generating means, and the selection means are included in a microprocessor.

10. The radio communication device according to claim 7, further comprising:

an alert mechanism for generating an alert; and a controller coupled to the alert mechanism and the selection means for activating the alert mechanism in response to the selection means selecting the message information included in the one of the first, second, third, and fourth words.

11. The radio communication device according to claim 7, wherein, in response to the determining means determining that four corrected words have been corrected by the error correction circuitry, the comparing means further compares each corrected word with any other corrected words, and wherein the choosing means comprises:

first word selecting means for selecting message information included in the fourth word for presentation when the four corrected words are determined to all be different;

second word selecting means for selecting, when three of the four corrected words are matching words, message information included in one of the matching words for presentation;

third word selecting means for selecting, when a first two of the four corrected words are first matching words and when a second two of the four corrected words are second matching words, message information included in the fourth word for presentation;

fifth word selecting means for selecting, when a first two of the four corrected words are matching words and a second two of the four corrected words are non-matching words, message information included in one of the matching words for presentation; and sixth word selecting means for selecting, when all of the four corrected words are matching words, message information included in the fourth word for presentation.

12. The radio communication device according to claim 7, wherein, in response to the determining means determining that three corrected words have been corrected by the error correction circuitry, the comparing means further compares each corrected word with any other corrected words, and wherein the choosing means comprises:

first word selecting means for selecting, when all three corrected words are different, message information included in the fourth word for presentation when the fourth word is included in the three corrected words; and second word selecting means for selecting, when two or more of the three corrected words are matching words, message information included in one of the matching words for presentation.

13. The radio communication device according to claim 7, wherein, in response to the determining means determining that two corrected words have been corrected by the error correction circuitry, the comparing means further compares each corrected word with any other corrected words, and the choosing means comprises:

first word selecting means for selecting, when the two corrected words are different, message information included in the fourth word for presentation when the fourth word is included in the two corrected words; and second word selecting means for selecting, when the two corrected words are equivalent, message information included in either of the two corrected words for presentation.

* * * * *